United States Patent
Reitzle et al.

(10) Patent No.: US 11,050,105 B2
(45) Date of Patent: Jun. 29, 2021

(54) BATTERY CELL ASSEMBLY

(71) Applicants: Robert Bosch GmbH, Stuttgart (DE);
Samsung SDI Co., Ltd., Yongin-si (KR)

(72) Inventors: Alexander Reitzle, Neu-Ulm (DE);
Sarmimala Hore, Stuttgart (DE);
Holger Fink, Stuttgart (DE)

(73) Assignees: Robert Bosch GmbH, Stuttgart (DE);
Samsung SDI, Co., Ltd., Yongin-si (KR)

( * ) Notice: Subject to any disclaimer, the term of this patent is extended or adjusted under 35 U.S.C. 154(b) by 481 days.

(21) Appl. No.: 14/892,154

(22) PCT Filed: May 9, 2014

(86) PCT No.: PCT/EP2014/059510
§ 371 (c)(1),
(2) Date: Nov. 18, 2015

(87) PCT Pub. No.: WO2014/187680
PCT Pub. Date: Nov. 27, 2014

(65) Prior Publication Data
US 2016/0111693 A1    Apr. 21, 2016

(30) Foreign Application Priority Data

May 22, 2013  (DE) .................. 10 2013 209 391.8

(51) Int. Cl.
*H01M 50/20* (2021.01)
*H01M 50/202* (2021.01)
(Continued)

(52) U.S. Cl.
CPC ....... *H01M 50/20* (2021.01); *H01M 10/0431* (2013.01); *H01M 10/48* (2013.01);
(Continued)

(58) Field of Classification Search
None
See application file for complete search history.

(56) References Cited

U.S. PATENT DOCUMENTS

2007/0087266 A1   4/2007   Bourke et al.
2008/0280192 A1  11/2008   Drozdz et al.
(Continued)

FOREIGN PATENT DOCUMENTS

CN    201355622 A    6/2002
CN    102696131 A    9/2012
(Continued)

OTHER PUBLICATIONS

Andrukaitis et al, Performance Vs. Safety of Some Primary and Rechargeable Lithium Batteries (Dec. 2004).*
(Continued)

*Primary Examiner* — Yoshitoshi Takeuchi
(74) *Attorney, Agent, or Firm* — Maginot, Moore & Beck LLP

(57) ABSTRACT

A battery module includes a number of battery cells, which are connected to each other at connection poles. The battery cells have respective hard shell housings, in which at least one bus bar extends. A number of wound and/or stacked battery cells is electrically contacted by the at least one bus bar.

9 Claims, 3 Drawing Sheets

(51) Int. Cl.

| | |
|---|---|
| *H01M 50/204* | (2021.01) |
| *H01M 50/207* | (2021.01) |
| *H01M 50/209* | (2021.01) |
| *H01M 50/211* | (2021.01) |
| *H01M 50/213* | (2021.01) |
| *H01M 50/216* | (2021.01) |
| *H01M 50/218* | (2021.01) |
| *H01M 50/22* | (2021.01) |
| *H01M 50/222* | (2021.01) |
| *H01M 50/224* | (2021.01) |
| *H01M 50/227* | (2021.01) |
| *H01M 50/229* | (2021.01) |
| *H01M 50/231* | (2021.01) |
| *H01M 50/233* | (2021.01) |
| *H01M 50/236* | (2021.01) |
| *H01M 50/238* | (2021.01) |
| *H01M 50/24* | (2021.01) |
| *H01M 50/242* | (2021.01) |
| *H01M 50/244* | (2021.01) |
| *H01M 50/247* | (2021.01) |
| *H01M 50/249* | (2021.01) |
| *H01M 50/251* | (2021.01) |
| *H01M 50/253* | (2021.01) |
| *H01M 50/262* | (2021.01) |
| *H01M 50/264* | (2021.01) |
| *H01M 50/267* | (2021.01) |
| *H01M 50/269* | (2021.01) |
| *H01M 50/271* | (2021.01) |
| *H01M 50/273* | (2021.01) |
| *H01M 50/276* | (2021.01) |
| *H01M 50/278* | (2021.01) |
| *H01M 50/28* | (2021.01) |
| *H01M 50/282* | (2021.01) |
| *H01M 50/284* | (2021.01) |
| *H01M 50/287* | (2021.01) |
| *H01M 50/289* | (2021.01) |
| *H01M 50/291* | (2021.01) |
| *H01M 50/293* | (2021.01) |
| *H01M 50/296* | (2021.01) |
| *H01M 50/298* | (2021.01) |
| *H01M 50/10* | (2021.01) |
| *H01M 50/593* | (2021.01) |
| *H01M 50/502* | (2021.01) |
| *H01M 50/50* | (2021.01) |
| *H01M 10/625* | (2014.01) |
| *H01M 10/613* | (2014.01) |
| *H01M 10/48* | (2006.01) |
| *H01M 10/6556* | (2014.01) |
| *H01M 10/04* | (2006.01) |
| H01M 10/6569 | (2014.01) |
| H01M 10/6561 | (2014.01) |
| H01M 10/656 | (2014.01) |
| H01M 10/6567 | (2014.01) |

(52) U.S. Cl.
CPC ....... *H01M 10/486* (2013.01); *H01M 10/613* (2015.04); *H01M 10/625* (2015.04); *H01M 10/6556* (2015.04); *H01M 50/502* (2021.01); H01M 10/656 (2015.04); H01M 10/6561 (2015.04); H01M 10/6567 (2015.04); H01M 10/6569 (2015.04); H01M 2220/20 (2013.01)

(56) References Cited

U.S. PATENT DOCUMENTS

| | | | |
|---|---|---|---|
| 2009/0061305 A1 | 3/2009 | Nishida et al. | |
| 2009/0297892 A1* | 12/2009 | Ijaz | ...... H01M 2/105 429/7 |
| 2011/0159350 A1 | 6/2011 | Ochi | |
| 2011/0171505 A1* | 7/2011 | Kishll | ...... H01M 2/1016 429/82 |
| 2011/0274951 A1* | 11/2011 | Yasui | ...... H01M 2/1016 429/53 |
| 2012/0164490 A1 | 6/2012 | Itoi et al. | |

FOREIGN PATENT DOCUMENTS

| | | | | |
|---|---|---|---|---|
| DE | 10 2004 063 986 A1 | | 7/2006 | |
| DE | 10 2009 035 465 A1 | | 2/2011 | |
| DE | 10 2011 079 394 A1 | | 1/2013 | |
| EP | 2355209 | * | 8/2011 | ............. H01M 2/30 |
| JP | 2355209 | * | 8/2011 | ............ H01M 10/42 |

OTHER PUBLICATIONS

International Search Report corresponding to PCT Application No. PCT/EP2014/059510, dated Jul. 4, 2014 (German and English language document) (7 pages).

\* cited by examiner

BATTERY CELL ASSEMBLY

This application is a 35 U.S.C. § 371 National Stage Application of PCT/EP2014/059510, filed on May 9, 2014, which claims the benefit of priority to Serial No. DE 10 2013 209 391.8, filed on May 22, 2013 in Germany, the disclosures of which are incorporated herein by reference in their entirety.

BACKGROUND

US 2008/0280192 A1 discloses a battery management system. A battery pack of a hybrid motor vehicle is maintained at a temperature by means of the proposed battery management system, said temperature being below a critical operating temperature of the battery pack. The battery pack comprises a number of cells that are linked together and also an air diffusing device. Furthermore, a pattern of openings is provided by means of which air is conveyed through the battery pack in a uniform flow. Furthermore, the battery management system in accordance with US 2008/0280192 A1 comprises sensors for detecting the temperature at least of one part of the cells, in addition a fan. The fan comprises an inlet through which the air is drawn in and an outlet through which the air that has been drawn in is conveyed into the interior of the battery pack. The temperature in the battery pack is reduced by means of the air that is conveyed into said battery pack. Furthermore, an electronic control apparatus is connected to the sensors and to the fan in order to control the fans according to the temperature signals that are received from the sensors so that the temperature of the battery pack can be maintained below a maximum permissible operating temperature.

Battery packs in accordance with the prior art in general comprise a number of battery cells that are linked together. The battery cells are generally linked together by means of connecting links that are embodied in a planar manner. After the individual battery cells are assembled and mechanically connected to a battery module, the connecting links that are generally produced from a metal material are connected to the connection terminals of the relevant battery cells. In general, the connecting links are produced from a metal material such as by way of example copper or aluminum. Furthermore, the connecting links with which the connection terminals of the battery cells are connected to a battery pack are embodied as bonded connections during the course of the laser welding process.

SUMMARY

In accordance with the disclosure, a battery module is proposed that is formed from a number of battery cells that are linked together, wherein the battery cells are embodied as wound and/or stacked battery cells, wherein the electrodes are stacked and/or wound and said electrodes are received in a common hard shell housing through which at least one current-collecting rail extends. The respective connectors of the battery cells are formed by means of the end faces of said battery cells so that said connectors can be contacted within the housing that is common to the wound or stacked battery cells in a particularly simple manner by means of current-collecting rails that extend through said housing, by way of example said current-collecting rails being received on the upper side or lower side.

In a first embodiment variant, it is possible that the individual wound and/or stacked battery cells are separated from one another by means of separating walls. The separating walls in accordance with this embodiment variant divide the hard shell housing that is common to the battery cells into individual chambers that receive in each case a wound and/or stacked battery cell. In accordance with a further embodiment variant of the solution that is proposed in accordance with the disclosure, it is also possible to embody the hard shell housing that is common to the wound and/or stacked battery cells without separating walls. In this case, the hard shell housing forms a common chamber for all the battery cells that in particular are embodied as wound or stacked battery cells.

Furthermore, by way of example the mentioned first current-collecting rail and a further second current-collecting rail extend on the upper side and lower side of the hard shell housing that is common to the wound and/or stacked battery cells. The two current collecting rails extend through the hard shell housing if said housing is embodied with chambers, if said housing is embodied without chambers and said current-collecting rails contact the battery cells in each case on the end faces of said battery cells, said battery cells being embodied as wound or stacked battery cells. Insulating devices can be received in the first current-collecting rail and also the second current-collecting rail. The insulating devices have the purpose of achieving a battery module with a series connection. In this case, the respective wound or stacked battery cells are insulated with respect to one another. If the insulating device is not included, the individual battery winding or battery stacking would be linked together in a parallel manner.

Cooling lines are received in the region of the current-collecting rails that extend through the hard shell housing, said current-collecting rails can extend on the lower side and on the upper side of the hard shell housing. These cooling lines are used for the purpose of cooling the individual wound and/or stacked battery cells that are received in the common hard shell housing and to limit an increase in temperature that occurs during the operation of the battery module. A cooling medium can flow through the cooling lines, said cooling medium being by way of example in a gaseous phase or in a fluid phase, wherein the latter renders it possible to convey heat in a clearly improved manner.

Sensors are received in the two current-collecting rails that either extend through a hard shell housing that is embodied with individual chambers or can extend through a hard shell housing that is embodied without chambers. The temperature that prevails in the hard shell housing can be determined by means of the sensors; in addition, it is possible to determine the temperature of the cooling medium by means of the sensors that are arranged in the interior of the hard shell housing that is common to the wound and/or stacked battery cells and it is possible to increase or decrease the through-flow of the cooling medium accordingly in dependence upon the change in temperature of said cooling medium. By virtue of the fact that the hard shell housing for all battery cells of the battery module is formed as precisely one housing, a cooling arrangement is achieved that can be produced in quite a simple manner with regard to manufacturing technology, wherein this is irrespective of whether the hard shell housing that is common to the wound and/or stacked battery cells is embodied with chambers or is embodied without chambers.

The hard shell housing in which the battery cells that are embodied as wound and/or stacked battery cells are arranged is preferably produced from a synthetic material, by way of example using the injection molding method. Injection molding materials of the type that comprise fiber-reinforced polymer materials (PPD 14) are in particular suitable as materials for the hard shell housing as a result of their mechanical rigidity, the flammability and the fracture toughness. Furthermore, metal material is possible or metal that is provided with an insulating coating by way of example with an insulating paint on its inner face and outer face.

It is possible by means of the proposed solution in accordance with the disclosure to omit the quite costly bonded joining process of laser welding that involves a large input of energy. The individual battery modules can be connected to the individual current-collecting rails that extend through the respective hard shell housing of the battery module without having to produce an electrical connection after assembling a battery module. In addition, the thermal loading of the connection terminals or the connection terminals of the battery module can be omitted, said thermal loading being associated with the bonded joining process, preferably the laser welding process. The battery module that is obtained can be embodied as fundamentally lighter by means of using a common hard shell housing that receives the wound and/or stacked battery cells, this lighter battery module has a positive effect on the weight of a battery pack that comprises multiple battery modules.

Furthermore, it is possible by means of the solution that is proposed in accordance with the disclosure that apart from the electrical connectors, the sensor technology and also the cooling arrangement can be integrated into the hard shell housing. According to the solution that is proposed in accordance with the disclosure, these components are likewise received in the region of the current-collecting rails on the upper side and lower side of the hard shell housing and said components are furthermore protected from external influences by means of the hard shell housing.

It is to be mentioned as further advantages of this battery module that is proposed in accordance with the disclosure that said battery module comprises a significant reduction in size with respect to the solutions from the prior art, said weight reduction being associated with a considerable reduction in weight. The solution that is proposed in accordance with the disclosure is characterized by means of an automatic electrical insulating device that in addition can be monitored at the system level in a particularly simple manner. In addition, as a result of choosing the basic material as a synthetic material, there is increased safety with respect to short circuiting within the battery module. In addition, a considerably improved protection against accidental contact is to be mentioned as being advantageous since the individual elements that link the battery cells together can be accommodated in the interior of the module.

The reduction in weight can on the one hand be achieved by means of using a polymer material for the hard shell housing, in addition a weight reduction can also be achieved by virtue of the fact that in the case of a hard shell housing that is embodied without chambers, intermediate walls can be omitted that would otherwise contribute to the weight. The solution that is proposed in accordance with the disclosure offers a battery module in a box design that is considerably easier to produce and that entirely eliminates the problem of corrosion. In the case of the solution that is proposed in accordance with the disclosure, the electrolyte does not come into contact with the inner sides of the hard shell housing. As a result of the embodiment that is proposed in accordance with the disclosure of a battery module having a hard shell housing that is embodied from a synthetic material, it is possible to achieve a particularly high level of standardization during the production process. It is thus possible by way of example to stipulate the dimensions of a battery module by means of a standard hard shell housing configuration. The power of the respective battery module is dependent upon the number of the wound and/or stacked battery cells that are used. An individual standard configuration of a hard shell housing is feasible, said configuration providing a standard configuration of the battery module, whereby in a large series production of battery modules, the production costs can be significantly reduced.

In the case of a hard shell housing it is also possible to provide an air-diffusing aperture in the hard shell housing in a manner that is extremely simple as far as manufacturing technology is concerned.

BRIEF DESCRIPTION OF THE DRAWINGS

The disclosure is described hereinunder in detail with reference to the drawing.

In the drawings.

DETAILED DESCRIPTION

Figure 1:
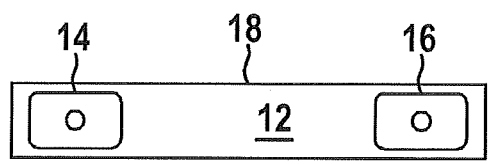
FIG. 1 illustrates a plan view of a battery cell.

The illustration in accordance with FIG. 1 is a plan view of a battery cell.

Figure 2:
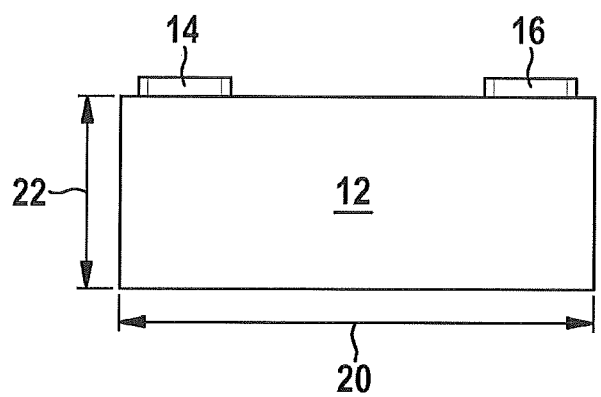
FIG. 2 illustrates a side view of the battery cell in accordance with FIG. 2.

A battery cell 10 comprises on its upper side 12 a first connection terminal, a positive terminal, cf. position 14 and a further second connection terminal 16 as a negative terminal. In addition, the battery cell 10 comprises a housing 18. In FIG. 2, it is, evident that the battery cell 10 in accordance with FIG. 1 has an essentially rectangular appearance, wherein a length 20 of the housing 18 exceeds a housing height 22.

Figure 3:
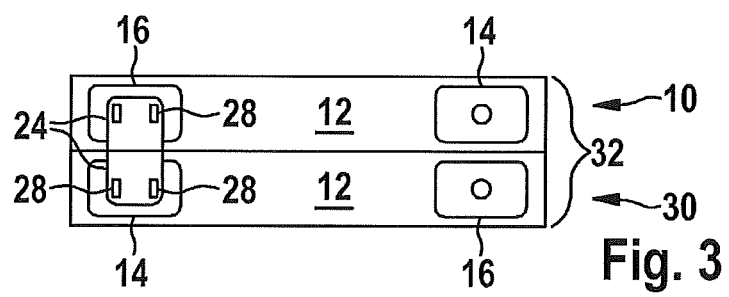
FIG. 3 illustrates a plan view of two battery cells that are linked together by means of a connecting link, a battery module.

From the plan view in accordance with FIG. 3, it is apparent that individual terminals 14, 16 of the battery cell 10 and also a further battery cell 30 are linked together by means of connecting links 24. The connecting links 24 are generally formed from an electrically conductive material, such as by way of example copper, aluminum or an alloy of the two parts. In FIG. 3, it is further apparent that the connecting links 24 are connected at connecting sites 26 to the individual connection terminals 14, 16 in a bonded manner, said connecting sites being embodied in general as laser welding sites 28. The process of connecting the connecting links 24 to the connection terminals 14, 16 of the two battery cells 10, 30 in a bonded manner represents a relatively complex joining process.

Figure 4:
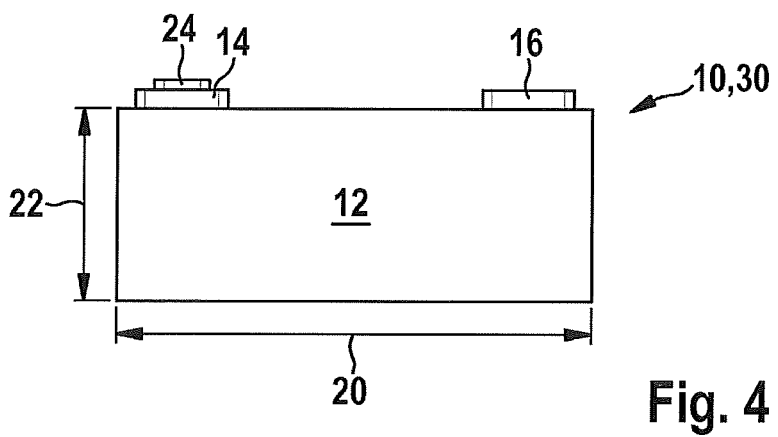
FIG. 4 illustrates a side view of the battery module in accordance with FIG. 3.

FIG. 4 illustrates a side view of a battery module 32 in accordance with the illustration in FIG. 3, wherein likewise a length 20 of the housing 18 of the battery cells 10, 30 exceeds the housing height 22.

Figure 5:
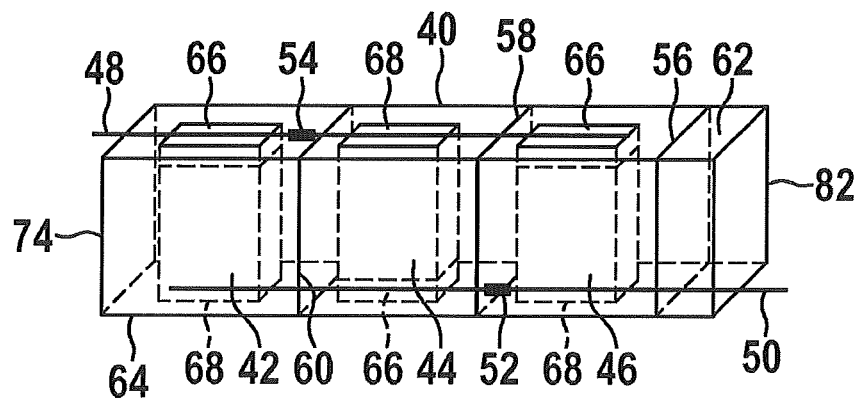
FIG. 5 illustrates a schematic view of a hard shell housing that is embodied as comprising chambers, said hard shell housing having wound battery cells that are received in said chambers and are electrically contacted by way of current-collecting rails.

The illustration in accordance with FIG. 5 is a first embodiment variant of the battery module that is proposed in accordance with the disclosure.

FIG. 5 illustrates that within a hard shell housing that is preferably produced from a synthetic material, such as by way of example fiber-reinforced polymer material for example PPD 14. Individual battery cells that are preferably embodied as wound and/or stacked battery cells 42, 44, 46 and that are adjacent to one another are arranged in the hard shell housing 40, wherein in each case one of the wound and/or stacked battery cells 42, 44 or 46 is located in a separate chamber within the hard shell housing 40. The individual chambers within the hard shell housing 40 are formed by means of separating walls 56, 58 or 60. Since the hard shell housing 40 is divided into chambers by means of separating walls 56, 58 or 60, this advantageously offers an electrical insulation of the individual wound or stacked battery cells 42, 44, 46 with respect to one another. In the event of an incident that concerns safety, a chain reaction, in other words a "thermal runaway" can consequently be prevented. Furthermore, a build-up of mixed potential as a result of possible mutual contact of the individual wound and/or stacked battery cells 42, 44, can be prevented by means of the individual separating walls 56, 58 or 60.

Furthermore, a first current-collecting rail 48 and also a second current-collecting rail 50 extend through the hard shell housing 40. The two current-collecting rails 48, 50 extend preferably on an upper side 62 or on a lower side 64 respectively of the hard shell housing 40 of the battery module 32.

As is schematically illustrated in the illustration in accordance with FIG. 5, each of the two current-collecting rails 48, 50 comprises an insulating device, wherein a first insulating device is indicated by means of a reference numeral 52 and a second insulating device is indicated by means of reference numeral 54 in FIG. 5.

Furthermore, it is evident in the illustration in accordance with FIG. 5 that the battery cells that are embodied as wound and/or stacked battery cells 42, 44, 46 contact in each case with their end faces 66, 68 the two current-collecting rails 48 or 50 respectively. The individual battery cells that are embodied as wound or stacked battery cells 42, 44, 46 can contact the current-collecting rails 48 or 50 by way of a clamp connection, a screw connection, a clip mechanism, a holding device by means of a clasp and the like.

It is evident in FIG. 5 that the three wound and/or stacked battery cells 42, 44, 46 are embedded in each case in the hard shell housing 40 in an alternating sequence, which relates to the end faces 66 or 68. Furthermore, it is apparent in the illustration in accordance with FIG. 5 that the three wound and/or stacked battery cells 42, 44, 46 in this embodiment variant are connected in series. It is naturally also possible to connect the three wound and/or stacked battery cells 42, 44, 46 in parallel. Each of the wound and/or stacked battery cells 42, 44, 46 that are arranged in the hard shell housing 40 has its own electrolyte store. However, more of the wound and/or stacked battery cells 42, 44, 46 can access a common electrolyte store. Each of the wound and/or stacked battery cells 42, 44, 46 is surrounded by a protective case that effectively prevents electrolytes from escaping from the interior of the wound and/or stacked battery cells 42, 44, 46.

The protective cases are produced from a material such as by way of example Nomex®, Technora®, or Kefla® with which the wound and/or stacked battery cells 42, 44, 46 are protected in the event of a "thermal runaway".

As is further illustrated in FIG. 5, the individual wound and/or stacked battery cells 42, 44, 46 are connected in each case to common current-collecting rails 48, 50 that support the first insulating device 52 or the second insulating device 54 respectively. The individual wound and/or stacked battery cells 42, 44, 46 can be connected either in a series or in a parallel circuit by means of the insulating device. The electrically conductive end faces 66, 68 of each of the wound and/or stacked battery cells 42, 44, 46 are coupled to the current-collecting rails 48 or 50 respectively by way of example by means of a clip mechanism or by means of a resilient effect. The two current-collecting rails 48 or 50 are received by way of suitable fastening devices on the inner faces of the hard shell housing 40. The current-collecting rails 48, 50 having wound and/or stacked battery cells 42, 44, 46 that is by way of example pre-assembled on said current-collecting rails can be embedded in the hard shell housing 40 in a simple manner and for this purpose the hard shell housing 40 can be accordingly configured, by way of example is embodied on the two longitudinal sides that lie opposite one another with two ducts or grooves or the like. In connection with the illustration in accordance with FIG. 5, the hard shell housing 40 that is illustrated in this figure comprises separating walls 56, 58 and 60. By way of example, electronic components can be arranged on these separating walls 56, 58, 60. The parameters of the corresponding next wound and/or stacked battery cell 42 or 44 or 46 can be recorded by way of electronic components of this type. In the event of a disruption in operation, by way of example a "thermal runaway", the separating walls 56, 58 or 60 offer a possibility of isolating the individual wound and/or stacked battery cells 42, 44 and 46 with respect to one another. A version of this type of the hard shell housing 40 that comprises chambers would potentially retain in the respective chamber the gaseous components of the battery module 32 that are escaping in the event of a "thermal runaway" so that escaping gaseous components do not spread within the entire hard shell housing 40.

The separating walls 56, 58 or 60 are arranged at spaced intervals in relation to the insulating device 52 or 54 that are provided on the current-collecting rails 48, 50. The spaced intervals are used to render possible a separation and can be affected by tolerances. The spaced intervals are determined by means of the desired energy density or power density. The individual wound or stacked battery cells 42, 44 or can be connected in series by means of the insulating devices 52 or 54. In the event that the individual separating walls 56, 58, 60 are resilient, in other words flexible, electronic components such as by way of example current sensors, temperature sensors etc. can be arranged on the particular separating walls 56, 58, 60 that can be deformed. The separating walls 56, 58 or 60 do not represent an electrical insulation per se but rather a spatial isolation of the individual battery cells 42, 44 or 46 that are embodied as stacked or wound.

Figure 6:
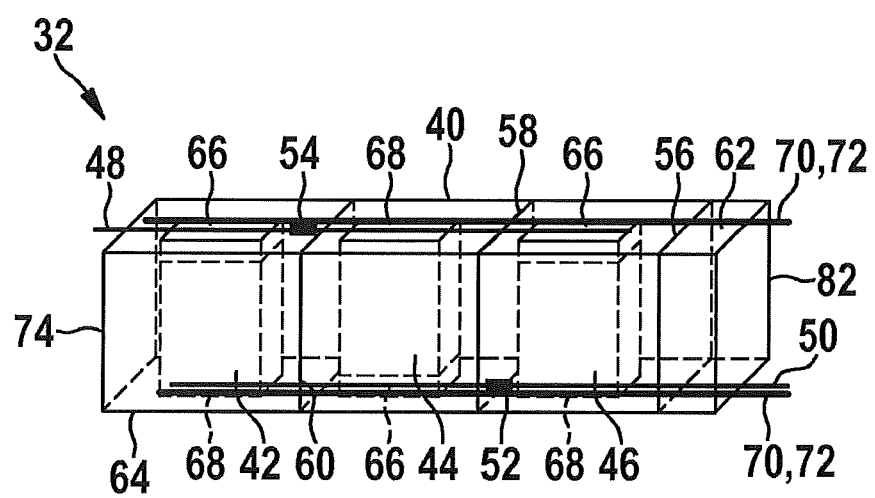
FIG. 6 illustrates a hard shell housing that is likewise embodied with chambers, said hard shell housing having current-collecting rails and also a line for a cooling medium.

A further embodiment variant of the battery module 32 that is proposed in accordance with the disclosure is evident in FIG. 6.

The battery module 32 that is illustrated in FIG. 6 also comprises a hard shell housing 40 that is divided into chambers as said hard shell housing includes the separating walls 56, 58 or 60 by way of which the wound and/or stacked battery cells 42, 44, 46 that are arranged in the hard shell housing 40 are separated from one another and to some extent are arranged in individual chambers. Cooling lines 70 that convey a cooling medium 72 extend in the longitudinal direction through the hard shell housing 40 in the region of the two current-collecting rails 48 or 50. The cooling medium 72 can be a cooling medium of the type that is either present in a fluid phase or in a gaseous phase or also a combination of the two. In a particularly simple manner with regard to production technology the cooling lines 70 extend in the region of the hard shell housing 40, in particular in the region of the upper side and lower side 62 or 64 and the current-collecting rails 48, 50 also extend in said region. It is evident from the illustration in accordance with FIG. 6 that in a similar manner to the illustration in accordance with FIG. 5, the individual wound and/or stacked battery cells 42, 44 or 46 are assembled in an alternating sequence in relation to their first end faces 66 or second end faces 68.

Also in the embodiment variant in accordance with FIG. 6, the wound and/or stacked battery cells 42, 44, 46 are connected in series in an alternating sequence—which relates to the arrangement of the end faces 66, 68 that represent the connection terminals—to the current-collecting rails 48, 50.

By way of example, the hard shell housing 40 that is illustrated in FIGS. 5 and 6 can be injection molded from a polymer material. However, it is also possible to produce the hard shell housing 40 from a metal material that by way of example can comprise a polymer coating on its inner face, said polymer coating being used to electrically insulate the wound and/or stacked battery cells 42, 44, 46 that are received in the hard shell housing 40. Furthermore, the hard shell housing 40 comprises a first housing side surface and also a second housing side surface 82 that lies opposite said first housing side surface. Both the cooling lines 70 as well as the current-collecting rails 48 or 50 exit the housing through the mentioned housing side surfaces in the embodiment variant of the battery module 32 in accordance with FIG. 6. In the case of assembling the individual wound battery cells in the hard shell housing 40, or more precisely in the variant that does not comprise any chambers, at least one of the two housing side surfaces 74 or 82 can be opened in order to assemble the individual wound battery cells 42, 44, 46 that are contacted by the current-collecting rails 48 or 50. The hard shell housing is hermetically sealed with respect to the exterior by way of the two housing side surfaces 74 or 82 and the upper side 62 and the lower side 64 of the hard shell housing 40.

Figure 7:
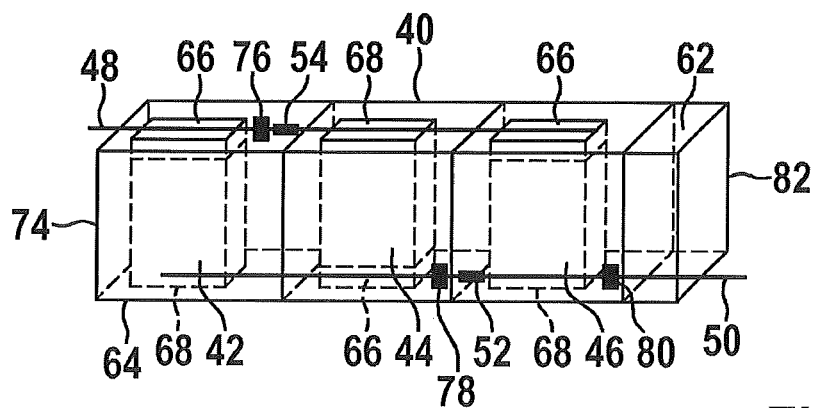
FIG. 7 illustrates a hard shell housing that is embodied without chambers, said hard shell housing having current-collecting rails that extend within said housing and also sensors that are arranged on the current collecting rails

In the illustration in accordance with FIG. 7, an embodiment variant of the battery module is illustrated that is proposed in accordance with the disclosure that does not comprise chambers.

It is apparent from FIG. 7 that the separating walls 56, 58, 60 in each case are omitted in this embodiment variant of the hard shell housing 40 for receiving the wound battery cells 42, 44, 46. This means that the interior space of the hard shell housing 40 forms per se a single through-going chamber in which through which the current-collecting rails 48, 50 extend. In a similar manner to the above described embodiment variant of an interior space of the hard shell housing 40 that is divided into individual chambers by means of the separating walls 56, 58, 60, the current collecting rails 48 extend through the housing side surfaces 74 or 82.

Furthermore, it is apparent from the illustration in accordance with FIG. 7 that sensors 76, 78, 80 are received in the two current-collecting rails 48 or 50. On the one hand, it is possible using the sensors to measure by way of example the currents in the current-collecting rails 48, 50. On the other hand, it is possible to use temperature sensors as sensors 76, 78, 80 with which it is possible to continuously monitor the internal temperature of the closed hard shell housing 40 that in this case accommodates three wound battery cells 42, 44, 46.

It is evident in accordance with FIG. 7 that in a similar manner to the embodiment variant in accordance with FIGS. 5 and 6, the wound and/or stacked battery cells 42, 44, 46 are arranged in each case in a mirror-inverted inverted manner in an alternating sequence in relation to their end faces 66, 68 and are contacted by the corresponding current-collecting rails 48, 50. The current-collecting rails 48 or 50 extend through the interior of the hard shell housing 40 of the first housing side surface 74 towards the second housing side surface 82.

Furthermore, FIG. 7 illustrates that the individual wound and/or stacked battery cells 42, 44, 46 can comprise protective cases that are produced from Nomex®, Technora® or also Kevlar®. In the event of "an incident that concerns safety" an impermissibly high build-up of pressure in the interior space of the hard shell housing 40 is prevented by virtue of the fact that individual outlet valves can be provided in the hard shell housing 40 either on the upper side 62 or the lower side 64 and it is possible by way of said individual outlet valves to reduce the pressure in the interior of the hard shell housing 40.

It is also possible to use in lieu of the mentioned materials Nomex®, Kevlar®, Technora® other suitable materials that protect adjacent wound and/or stacked battery cells 42, 44, 46 with respect to one another. The protective cases that surround the individual wound and/or stacked battery cells 42, 44, 46 in addition to receiving the ballistic material also has the purpose of protecting the wound and or stacked battery cells 42, 44, 46 against a leaking cooling line 70 that extends through the interior of the hard shell housing 40. An extension of the battery module in accordance with FIG. 7 is apparent in FIG. 8.

Figure 8:
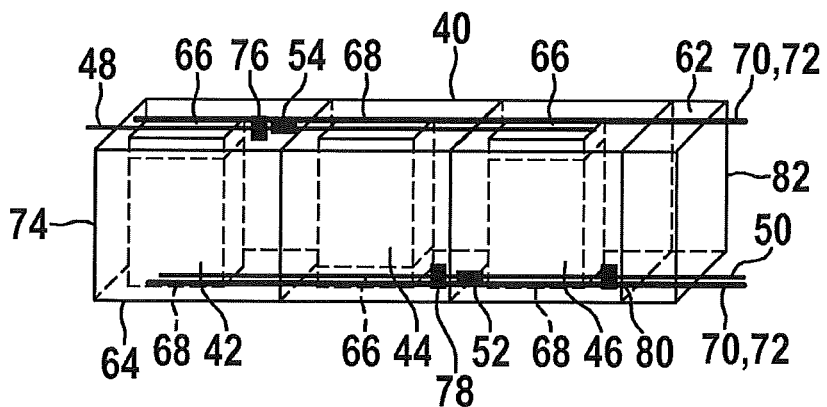
FIG. 8 illustrates a hard shell housing that is likewise embodied without chambers, wherein multiple battery cells that are embodied as wound battery cells, said hard shell housing having current-collecting rails, cooling medium lines and also sensors.

As is evident from the illustration in accordance with FIG. 8, it is not only the current-collecting rails 48 or 50 that extend through the respective housing side surfaces 74, 82 but rather, in addition to said current-collecting rails, the cooling lines 70 that are previously mentioned in connection with the first embodiment variant in accordance with FIGS. 5 and 6 extend through the respective housing side surfaces 74, 82. Protective cases that are mentioned and are provided around the individual wound battery cells 42, 44, 46 also protect said battery cells against cooling medium that escapes from the cooling line 70. The cooling medium 72 that flows in the cooling lines 70 can be both a gaseous as well as a fluid medium; a mix of the two media phases is also possible.

The temperatures in particular of the hard shell housing 40 can be measured by means of sensors 76, 78, 80. The sensors 76, 78, 80 can also be combined temperature sensors and current sensors that are arranged distributed within the hard shell housing by way of example on the separating walls 56, 58, 60 that render it possible to divide the hard shell housing into chambers. When distributing temperature sensors within the hard shell housing 40, it is necessary to take into account the influence of the waste heat of the battery cells 42, 44, 46 that are embodied as wound or stacked battery cells. When using current sensors as sensors 76, 78, 80, they are to be distributed within the hard shell housing 40 in such a manner that the inductive influence is minimized.

The invention claimed is:

1. A battery module comprising:
   a plurality of battery cells that in each case are linked together, the battery cells of the plurality of battery cells received in a hard shell housing; and
   at least one current-collecting rail extending in the hard shell housing and the plurality of battery cells is electrically contacted by way of the at least one current-collecting rail,
   wherein the batteries of the plurality of battery cells are at least one of wound and stacked,
   wherein the hard shell housing comprises an upper side wall and a lower side wall,
   wherein the at least one current-collecting rail extends through the hard shell housing and is in direct contact with at least one of the upper side wall and the lower side wall of the hard shell housing, the at least one current-collecting rail being interposed between the plurality of battery cells and the at least one of the upper side wall and the lower side wall,
   wherein the hard shell housing comprises a first side arranged perpendicularly relative to the upper side wall and the lower side wall,
   wherein the hard shell housing comprises a second side arranged opposite the first side and perpendicularly relative to the upper side wall and the lower side wall,
   wherein the at least one current-collecting rail exits the hard shell housing through at least one of the first side and the second side,
   wherein the hard shell housing further comprises a plurality of separating walls, each separating wall of the plurality of separating walls having a first wall side defining a first isolated chamber in which a first battery cell of the plurality of battery cells is received, and an opposite second wall side defining a second isolated chamber in which a second battery cell of the plurality of battery cells is received, and
   wherein each separating wall of the plurality of separating walls extends from the upper side wall of the housing to the lower side wall of the housing.

2. The battery module as claimed in claim 1, wherein:
   the at least one current-collecting rail includes a first and a second current-collecting rail,
   the hard shell housing comprises the first and the second current-collecting rails, and
   the first and the second current-collecting rails each include an insulating device configured to achieve a series connection or parallel connection of the battery cells of the plurality of battery cells.

3. The battery module as claimed in claim 1, wherein the battery cells of the plurality of battery cells are contacted on their end faces by the at least one current-collecting rail.

4. The battery module as claimed in claim 2, wherein:
   the first current-collecting rail extends through the hard shell housing and is in direct contact with the upper side wall of the hard shell housing and interposed between the plurality of battery cells and the upper side wall, and
   the second current-collecting rail extends through the hard shell housing and is in direct contact with the lower side wall of the hard shell housing and interposed between the plurality of battery cells and the lower side wall.

5. The battery module as claimed in claim 1, further comprising:
   cooling lines for a cooling medium, the cooling lines configured to extend in the hard shell housing parallel to the at least one current-collecting rail.

6. The battery module as claimed in claim 5, wherein the cooling medium is present in a fluid phase, a gaseous phase, or sublimated.

7. The battery module as claimed in claim 1, wherein the battery cells of the plurality of battery cells are separated from one another within the hard shell housing by a separating wall of the plurality of separating walls.

8. The battery module as claimed in claim 1, wherein:
   the at least one current-collecting rail comprises a plurality of sensors, and
   each sensor of the plurality of sensors is configured to measure at least one of temperature and current.

9. The battery module as claimed in claim 1, wherein at least one separating wall of the plurality of separating walls is flexible.

* * * * *